United States Patent
Vining et al.

(10) Patent No.: US 11,281,284 B2
(45) Date of Patent: Mar. 22, 2022

(54) POWER CONSUMPTION REDUCTION IN USB 2.0 REDRIVER AND IN EUSB2 REPEATER

(71) Applicant: Texas Instruments Incorporated, Dallas, TX (US)

(72) Inventors: Suzanne Mary Vining, Plano, TX (US); Douglas Edward Wente, Murphy, TX (US); Win Naing Maung, Plano, TX (US); Julie Marie Nirchi, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 35 days.

(21) Appl. No.: 16/717,836

(22) Filed: Dec. 17, 2019

(65) Prior Publication Data
US 2020/0257354 A1  Aug. 13, 2020

Related U.S. Application Data

(60) Provisional application No. 62/804,795, filed on Feb. 13, 2019.

(51) Int. Cl.
*G06F 1/3234* (2019.01)
*G06F 13/42* (2006.01)
*G06F 1/3206* (2019.01)
*G06F 13/40* (2006.01)

(52) U.S. Cl.
CPC .......... *G06F 1/3253* (2013.01); *G06F 1/3206* (2013.01); *G06F 13/4045* (2013.01); *G06F 13/4282* (2013.01); *G06F 2213/0042* (2013.01)

(58) Field of Classification Search
CPC ........ G06F 1/32; G06F 1/3203; G06F 1/3206; G06F 1/3253; G06F 1/3287; G06F 13/4004; G06F 13/4027; G06F 13/4045; G06F 13/4282; G06F 2213/0042
See application file for complete search history.

(56) References Cited

U.S. PATENT DOCUMENTS

| | | | | |
|---|---|---|---|---|
| 2009/0135751 | A1* | 5/2009 | Hodges | G06F 1/3209 370/311 |
| 2014/0047257 | A1* | 2/2014 | Masson | G06F 1/3253 713/324 |
| 2014/0149609 | A1* | 5/2014 | Chan | G06F 13/385 710/16 |

(Continued)

*Primary Examiner* — Thomas J. Cleary
(74) *Attorney, Agent, or Firm* — Michael T. Gabrik; Charles A. Brill; Frank D. Cimino

(57) ABSTRACT

A method includes detecting a micro start of frame packet (μSOF) on a data bus. If there is at least one data packet contained in a microframe during the first threshold period after the μSOF, transmitters are held in an active state. If there is no data packet in the first threshold period after the μSOF, the transmitters are transitioned from the active state to an OFF state. The method also includes transitioning the transmitters from the OFF state to the active state prior to a switchback period before the end of the microframe. The method also includes transitioning the transmitters from the OFF state to the active state if a data packet is received in the OFF state. The method also includes dropping the data packet received in the OFF state and transitioning from the OFF state to the active state when the data packet is dropped.

23 Claims, 3 Drawing Sheets

(56) References Cited

U.S. PATENT DOCUMENTS

| | | | |
|---|---|---|---|
| 2016/0162430 A1* | 6/2016 | Ma | G06F 13/4295 |
| | | | 710/313 |
| 2016/0320823 A1* | 11/2016 | Gerber | G06F 1/3253 |
| 2017/0286360 A1* | 10/2017 | Srivastava | G06F 13/385 |
| 2018/0307293 A1* | 10/2018 | Lambert | G06F 13/4278 |
| 2018/0335830 A1* | 11/2018 | Srivastava | G06F 1/3253 |

* cited by examiner

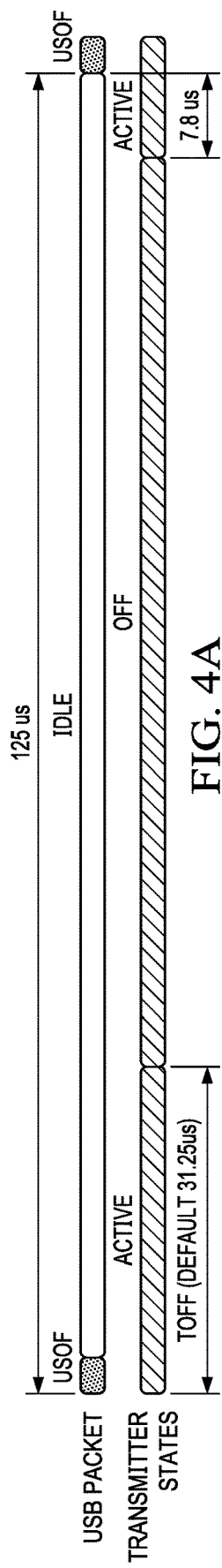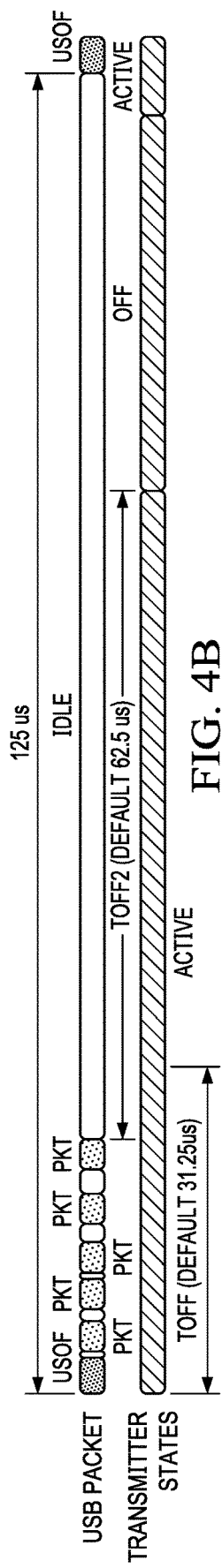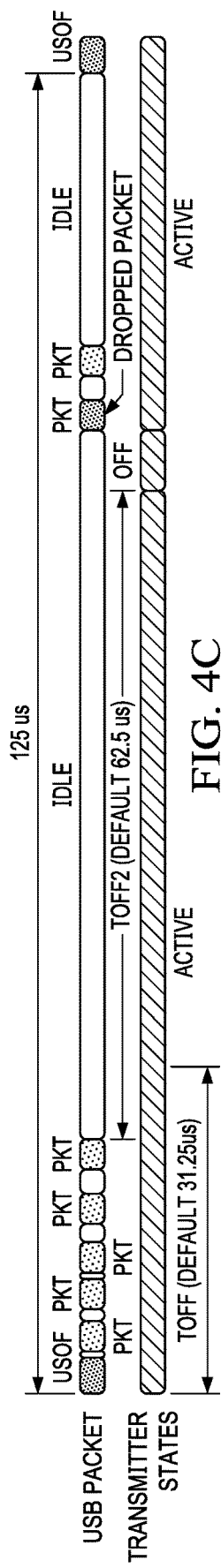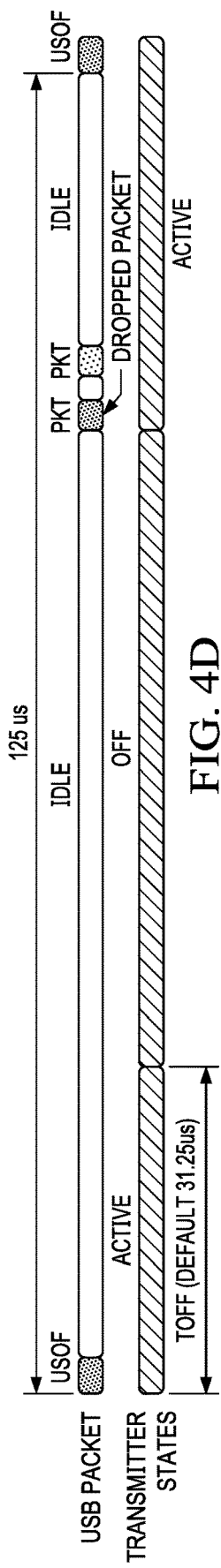

POWER CONSUMPTION REDUCTION IN USB 2.0 REDRIVER AND IN EUSB2 REPEATER

CROSS REFERENCE TO RELATED APPLICATION

This application claims priority from U.S. Provisional Application No. 62/804,795, filed Feb. 13, 2019, entitled "METHOD FOR HIGH SPEED (HS) USB 2.0 REDRIVER OR eUSB2 REPEATER POWER REDUCTION", assigned to the present assignee and incorporated herein by reference.

BACKGROUND

The disclosure generally relates to reducing power consumption in USB 2.0 redrivers and in embedded USB 2.0 (eUSB2) repeaters.

DESCRIPTION OF THE RELATED ART

Universal Serial Bus (USB) is an industry standard that establishes protocols for connection, communication and power supply for computers, peripheral devices and communication devices. The expansion of USB has resulted in the development of wide range of USB devices with varying power requirements. As power efficiency becomes critical in computers, peripheral devices and communication devices, embedded USB 2.0 (eUSB2) devices are used as a low voltage solution to traditional USB 2.0 devices.

In order to extend link distances and boost signal quality on a USB bus, USB 2.0 redrivers are currently used, while eUSB2 repeaters are currently used to convert signals between eUSB2 and USB 2.0. Generally, USB 2.0 redrivers and eUSB2 repeaters regenerate signals using equalizers and amplifiers to allow longer channel transmission and to reduce bit error rates. The bypassed signals are also conditioned to remove jitters.

According to a protocol, USB 2.0 redrivers and eUSB2 repeaters are required to repeat a high speed (HS) packet within 4 HS unit intervals (UIs) of receiving the packet. Also, the protocol requires that a peripheral device will only transmit to a host after receiving a packet from the host, and the peripheral device is required to transmit within 192 UIs of receiving a packet from the host. In order to comply with the protocol, transmitters generally operate in two states: an active state, and a standby state. In the active state, the transmitters transmit packets at full power by driving current to a load. In the standby state, although the transmitters remain idle, current is shunted to ground to maintain internal nodes and bias loops at normal levels to allow a quick transition to the active state. When the transmitters transition from the standby state to the active state, current is simply switched back to the load. As a result, power consumption in the standby state is same as the power consumption in the active state. Reduction in power consumption in USB 2.0 redrivers and in eUSB2 repeaters is desired.

SUMMARY

Various aspects of the present disclosure are directed to methods for reducing power consumption in USB 2.0 redrivers and embedded USB 2.0 (eUSB2) repeaters.

In one aspect, a method includes detecting a micro start of frame packet (µSOF) on a data bus. The µSOF indicates the start of a microframe. The method further includes determining if there are any data packets contained in the microframe during a first threshold period after the µSOF. If there is at least one data packet contained in the microframe during the first threshold period after the µSOF, one or more transmitters are held in an active state. If there is no data packet in the first threshold period after the µSOF, the transmitters are transitioned from the active state to an OFF state. The method also includes transitioning the transmitters from the OFF state to the active state prior to a switchback period before the end of the microframe. The method also includes transitioning the transmitters from the OFF state to the active state if a data packet is received in the OFF state. The method also includes receiving a data packet in the OFF state and dropping the data packet received in the OFF state. The method also includes transitioning the transmitters from the OFF state to the active state when the data packet is dropped.

In an additional aspect of the disclosure, the method includes setting a timer with at least a first, a second, and a third expiration time, wherein the first expiration time is the length of the microframe, the second expiration time is the first threshold period, and the third expiration time is the switchback period. The method also includes operating the communication device using the timer.

In an additional aspect of the disclosure, a method includes detecting a micro start of frame packet (µSOF) on a data bus. The method further includes determining if there are any data packets contained in the microframe during a first threshold period after the µSOF. If there is no data packet during the first threshold period after the µSOF, the transmitters are transitioned from the active state to an OFF state. If there is at least one data packet contained in the micro frame in the first threshold period after the µSOF, the transmitters are held in the active state for a second threshold period. The method also includes transitioning the transmitters from the OFF state to the active state if a data packet is received in the OFF state. The method also includes transitioning the transmitters from the OFF state to the active state prior to a switchback period before the end of the microframe.

BRIEF DESCRIPTION OF THE DRAWINGS

FIGS. 3A-3D and 4A-4D show timing diagrams of packets and transmitter states according to embodiments of the invention.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein. Rather, these descriptions are provided so that this disclosure will satisfy applicable requirements.

Figure 1:
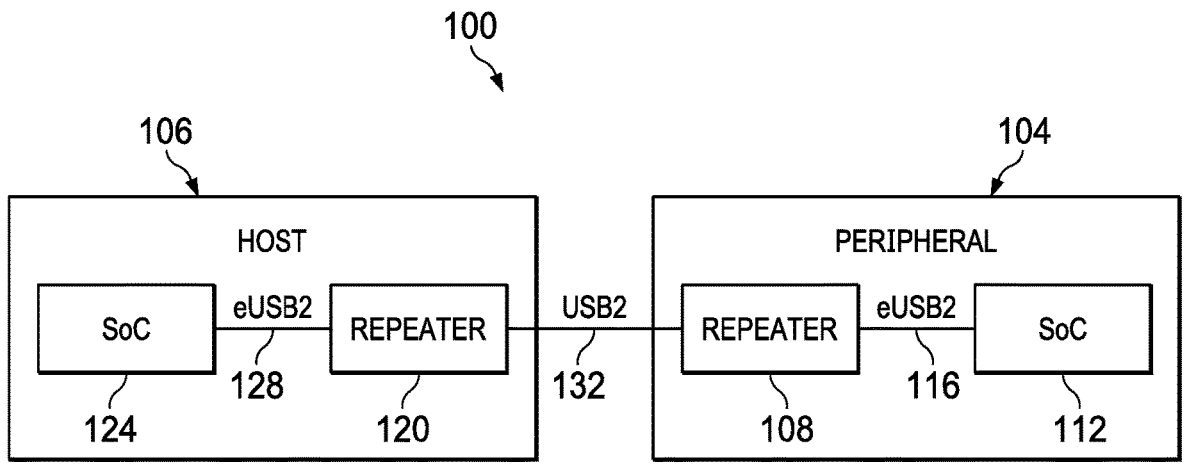
FIG. 1 is a block diagram illustrating a peripheral device connected to a host.

FIG. 1 is a block diagram 100 illustrating a peripheral device 104 connected to a host 106 in accordance with an exemplary embodiment. The peripheral device 104 includes an eUSB2 peripheral repeater 108 connected to a peripheral system-on-chip (SoC) 112 via an eUSB2 bus 116. The peripheral SoC 112 can be a processor, a controller or the like.

With reference to FIG. 1, the host 106 includes a host repeater 120 interconnected with a host SoC 124 via an eUSB2 bus 128. The host 106 is connected to the peripheral device 104 via a USB 2.0 bus 132. Thus, the USB 2.0 bus is used as an external connection between the host 108 and the peripheral device, and the eUSB2 bus 116 is used for inter-chip interconnect (e.g., interconnect the eUSB2 peripheral repeater 108 and the peripheral SoC 112).

In operation, the host 106 transmits a downstream packet to the peripheral device 104 over the USB 2.0 bus 132. The peripheral repeater 108 converts the received downstream packet, which is in a USB 2.0 signal form, to a downstream signal in an eUSB2 signal form and sends the downstream packet to the peripheral SoC 112 over the eUSB2 bus 116. The peripheral SoC 112 may respond to the host with an upstream packet which is transmitted to the peripheral repeater 108 over the eUSB2 bus 116. The peripheral repeater 108 converts the upstream packet, which is in an eUSB2 signal form, to an upstream packet in a USB 2.0 signal form and transmits the upstream packet to the host 106 over the USB 2.0 bus 132. Thus, the peripheral repeater 108 converts a USB 2.0 signal to an enUSB2 signal and vice versa.

Although the exemplary embodiments are described herein with reference to an eUSB2 repeater, the concepts of present disclosure are also applicable to a USB 2.0 redriver and to an eUSB2 redriver. The concepts and methods described herein can be utilized to reduce power consumption of an eUSB2 repeater, a USB 2.0 redriver, and an eUSB2 redriver. The concepts of the present disclosure are applicable to a repeater which may reside inside a peripheral device or inside a host device.

Figure 2:
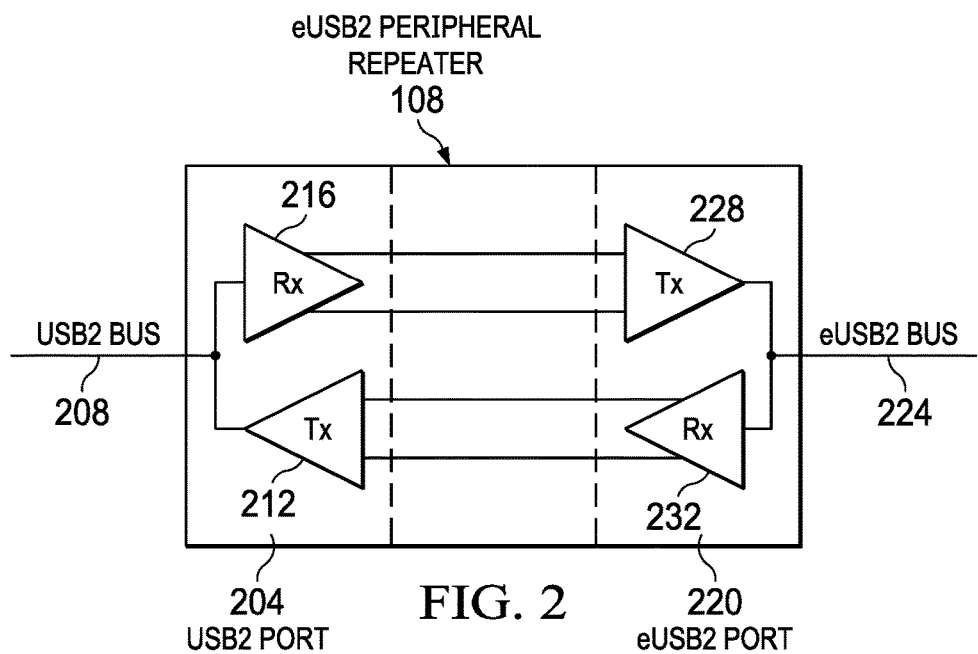
FIG. 2 is a block diagram of an eUSB2 peripheral repeater.

FIG. 2 is a more detailed block diagram of the eUSB2 peripheral repeater 108 in accordance with an exemplary embodiment. The eUSB2 peripheral repeater 108 includes a USB 2.0 port 204 configured to interface with a USB 2.0 bus 208. The USB 2.0 bus 208 provides connection to an external device such as the host 106 (shown in FIG. 1). The USB 2.0 port 204 includes a USB transmitter 212 and a USB receiver 216. The eUSB2 peripheral repeater 108 receives a downstream packet from a host over the USB 2.0 bus 208 through the USB receiver 216 and transmits an upstream packet to the host over the USB 2.0 bus 208 through the USB transmitter 212.

With continuing reference to FIG. 2, the eUSB2 peripheral repeater 108 also includes an eUSB2 port 220 configured to interface with an eUSB2 bus 224. The eUSB2 bus 224 provides an inter-chip interconnect with the peripheral SoC 112 (shown in FIG. 1). The eUSB2 port 224 includes an eUSB2 transmitter 228 and an eUSB2 receiver 232. The eUSB2 peripheral repeater 108 receives an upstream packet from the peripheral SoC 112 or another device over the eUSB2 bus 224 through the eUSB2 receiver 232 and transmits downstream packet to the peripheral SoC 112 (shown in FIG. 1) or another device over the eUSB2 bus 224 through the eUSB2 transmitter 228.

In one aspect, a micro start of frame packet (μSOF) is used to calibrate the eUSB2 repeater 108 (or a USB 2.0 redriver). The μSOF indicates the start of a microframe which has a length of 125 μs. The μSOF is periodically broadcast on the USB 2.0 bus 208 every 125 μs.

In an exemplary embodiment, the μSOF is detected on a data bus (e.g., the USB 2.0 bus 208 or the eUSB2 bus 224) and a timer is set with multiple threshold periods that are used to control (i.e., disable and enable) one or more transmitters. Depending on the type of devices used in a connection, various transmitter combinations are possible: USB 2.0 and USB 2.0; eUSB2 and eUSB2; and eUSB2 and USB 2.0. In these combinations, one or both transmitters can be controlled. In an exemplary embodiment, one or both of the 2 USB 2.0 transmitters can be controlled. In another exemplary embodiment, one or both of the 2 eUSB2 transmitters can be controlled. In yet another exemplary embodiment, one of both of eUSB2 transmitter or USB 2.0 transmitter can be controlled.

In an exemplary embodiment, a squelch circuit (not shown in FIG. 2) can be used to detect the μSOF. By locking onto the μSOF and turning OFF (i.e., disabling) one or both of the eUSB2 and USB 2.0 transmitters 228, 212 when the USB 2.0 bus 208 is idle, power consumption is reduced.

In an exemplary embodiment, the eUSB2 repeater 108 repeats isochronous packets (ie., time critical data) and asynchronous packets (i.e., bulk data) by relying on the multiple threshold periods while reducing power consumption. Since isochronous packets are bundled at the beginning of a microframe, one or both of the transmitters 212, 228 are turned OFF after isochronous data is transmitted. By holding the transmitters 212, 228 in an active state at the beginning of the microframe and by selecting a turn OFF threshold greater than normal inter-packet gaps, isochronous packets are transmitted. The transmitters 212, 228 are disabled during an idle portion of the microframe and are re-enabled prior to the next μSOF.

In an exemplary embodiment, if asynchronous packets arrive late in the microframe after the transmitters 212, 228 are disabled, the asynchronous packets are dropped. However, since a host must support retries of dropped asynchronous packets, the transmitters 212, 228 are re-enabled to an active state and held in the active state for the next 8 microframes to allow for the maximum retry times.

Consider, for example, immediately prior to the arrival of the μSOF, the transmitters 212, 228 are in an active state. When the μSOF is detected on the bus (e.g., USB 2.0 bus 208), a determination is made if there are any data packets contained in the microframe during a first threshold period after the μSOF. The first threshold period may be set as a percentage of the length of the microframe. In an exemplary embodiment, the first threshold period may be 31.25 μs. The first threshold period is also referred to as T OFF period and may, for example, be 31.25 μs. In another exemplary embodiment, the first threshold is updated after a μSOF is received for continuous calibration.

If there is at least one data packet contained in the microframe during the first threshold period after the μSOF, the transmitters 212, 228 are held in the active state to allow the transmitters 212, 228 to transmit the data packet. If, however, there are no data packets during the first threshold period after the μSOF, the transmitters 212, 228 are transitioned from the active state to an OFF state. In the OFF state, the transmitters 212, 228 are disabled. The transmitters 212, 228 are held in the OFF state until prior to a switchback period before the end of the microframe. The transmitters 212, 228 are transitioned from the OFF state to the active state prior to the switchback period before the end of the microframe to ensure that the transmitters 212, 228 are ready for the next microframe. The switchback period is greater than the maximum time required for transmitter to transition to the active state. If, however, a data packet is received at any time during the OFF state, the transmitters 212, 228 are transitioned from the OFF state to the active state.

If a data packet arrives when the transmitters are in the OFF state, the data packet is dropped. However, the transmitters 212, 228 are transitioned from the OFF state to the active state if a data packet is dropped. Since the dropped data packet is retried, the transmitters 212, 228 are transitioned to the active state to transmit when the data packet is retried.

When a data packet arrives while the transmitters 212, 228 are disabled, the transmitters 212, 228 are enabled following a normal sequence. Since it requires 1.4 µs to fully re-enable repeating, additional data packets received during this time is dropped. In an exemplary embodiment, if a data packet is dropped the transmitters 212, 228 are transitioned to the active state and is held in the active state for the next 8 microframes.

Variations within the scope of the disclosure are possible. In an exemplary embodiment, immediately prior to the arrival of the µSOF, the transmitters 212, 228 can be in a standby state instead of being in the active state. In the standby state, current is shunted to ground instead of being driven to a load. The transmitters 212, 228 are transitioned from the standby state to the active state to transmit data packets.

Although the transmitter remains idle in the standby state, current is shunted to ground to maintain internal nodes and bias loops at normal levels to allow a quick transition to the active state. When the transmitter transitions from the standby state to the active state, current is simply switched back to the load. As a result, the power consumption by the transmitter in the standby state is approximately equal to the power consumption in the active state.

FIGS. 3A-3D illustrate timing diagrams of various packet structures on the USB 2.0 bus 208 and various states of the transmitter in accordance with an exemplary embodiment. The transmitter can, for example, be the USB 2.0 transmitter 212 or the eUSB2 transmitter 228.

Figure 3A:
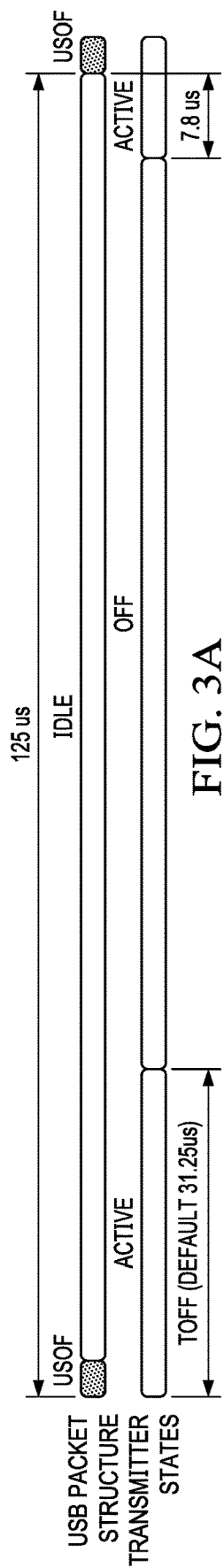

With reference to FIG. 3A, initially the transmitter is in an active state and a µSOF is detected on the USB 2.0 bus 208. The transmitter is held in the active state during the first threshold period after the µSOF. Since, there is no data packet during the first threshold period, the transmitter is transitioned from the active state to an OFF state. The transmitter is transitioned from the OFF state to the active state prior to the switchback period before the end of the microframe to prepare for the arrival of the next µSOF. The switchback period is greater than the maximum time required for the transmitter to transition to the active state.

Figure 3B:
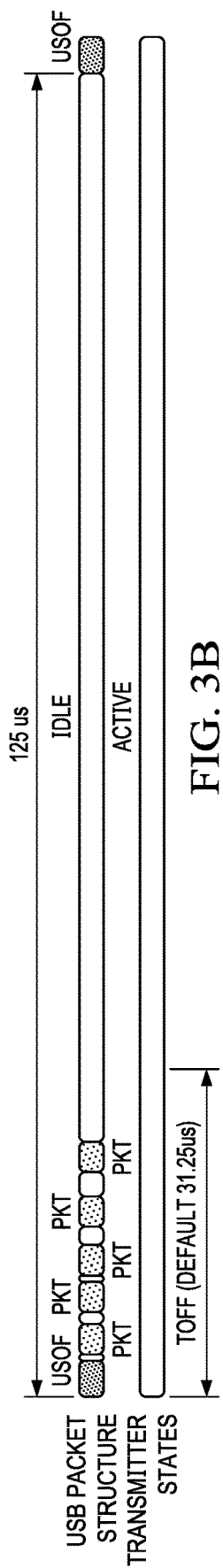

With reference to FIG. 3B, several data packets are contained in the microframe in the first threshold period after the µSOF. Accordingly, the transmitter is held in the active state to allow the transmitter to transmit the data packets. In this scenario, the transmitter is not disabled during the entire microframe.

Figure 3C:
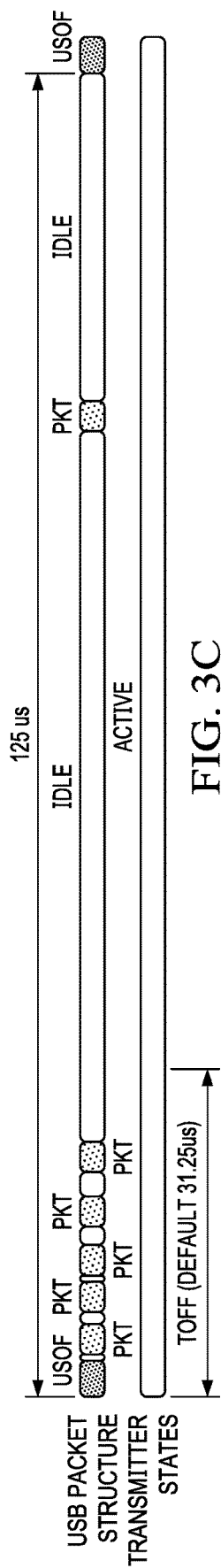

With reference to FIG. 3C, several data packets are contained in the microframe in the first threshold period after the µSOF. Accordingly, the transmitter is held in the active state. After the data packets are received during the first threshold period, the USB 2.0 bus 208 remains idle for some time until a late packet arrives. The late packet is a retry packet which is processed and transmitted by the transmitter. In this scenario, the transmitter is not disabled during the entire microframe.

Figure 3D:
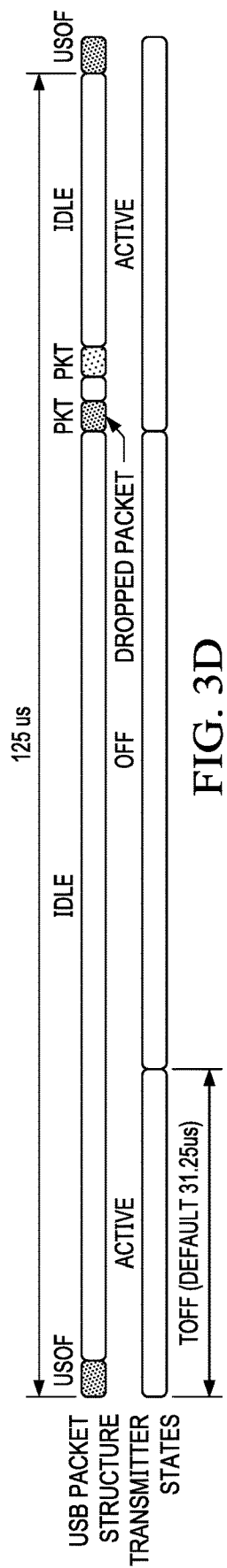

With reference to FIG. 3D, there is no data packet during the first threshold period. Accordingly, the transmitter is transitioned from the active state to the OFF state after the first threshold period. However, a late packet arrives in the microframe while the transmitter is in the OFF state. Since the late packet is received in the OFF state, the late packet is dropped and the transmitter is transitioned from the OFF state to the active state. A retry packet is received, and the retry packet is successfully repeated. Thus, the transmitter is re-enabled if a packet is received while the transmitter is disabled. In an exemplary embodiment, if a packet is dropped, the transmitter is transitioned to the active state and is held in the active state for the next 8 microframes to allow for the maximum retry times.

In another exemplary embodiment, if there is no data packet contained in the microframe in the first threshold period after the µSOF, the transmitter is transitioned from the active state to an OFF state. If, however, there is at least one data packet contained in the microframe in the first threshold period after the µSOF, the transmitter is held in the active state for a second threshold period. After the second threshold period, the transmitter is allowed to transition from the active state to the OFF state. The transmitter is again transitioned from the OFF state to the active state prior to a switchback period before the end of the microframe. If, a data packet is received during the OFF state, the data packet is dropped and thereafter the transmitter is transitioned from the OFF state to the active state to be ready to transmit the retried packet. In an exemplary embodiment, the length of the second threshold period is twice the length of the first threshold period.

FIGS. 4A-4D illustrate timing diagrams of various packet structures on the USB 2.0 bus 208 and various states of the transmitter in accordance with an exemplary embodiment. The transmitter can, for example, be the USB 2.0 transmitter 212 or the eUSB2 transmitter 228.

With reference to FIG. 4A, initially the transmitter is in an active state and a µSOF is detected on the USB 2.0 bus 208. The transmitter is held in the active state for the first threshold period after the µSOF. Since, there is no data packet during the first threshold period, the transmitter is transitioned from the active state to an OFF state after the first threshold period. The transmitter is transitioned from the OFF state to the active state prior to the switchback period before the end of the microframe for the arrival of the next µSOF. The switchback period is greater than the maximum time required for the transmitter to transition to the active state.

With reference to FIG. 4B, several data packets are contained in the microframe in the first threshold period after the µSOF. Accordingly, the transmitter is held in the active state to allow the transmitter to transmit the data packets. However, if no new data packets are received in a second threshold period, the transmitter is transitioned from the active state to the OFF state. The transmitter is again transitioned from the OFF state to the active state prior to the switchback period before the end of the microframe. In this scenario the transmitter is held in an active state because several data packets are received in the first threshold period. To reduce power consumption, if no new data packets are received in a second threshold period, the transmitter is allowed to transition from the active state to the OFF state.

With reference to FIG. 4C, several data packets are contained in the microframe in the first threshold period after the µSOF. Accordingly, the transmitter is held in the active state to allow the transmitter to transmit the data packets. Similar to the scenario in FIG. 4B, no new data packets are received in the second threshold period. Thus, to reduce power consumption, the transmitter is allowed to transition from the active state to the OFF state after the second threshold period. After the second threshold period, the transmitter is transitioned from the active state to the OFF state. After the transmitter is disabled, a late packet arrives which is dropped. Thus, the transmitter is transitioned from the OFF state to the active state to transmit the retried the packet.

With reference to FIG. 4D, no data packet is contained in the microframe in the first threshold period after the μSOF. Thus, the transmitter is transitioned from the active state to the OFF state after the first threshold period. A late packet which arrives while the transmitter is in the OFF state is dropped. The transmitter is transitioned from the OFF state to the active state to transmit the retried packet. The retried packet is successfully repeated.

While use of two threshold period results in greater power efficiency than use of only a single threshold period, use of two threshold periods also increases risk of system errors.

Various illustrative components, blocks, modules, circuits, and steps have been described above in general terms of their functionality. Whether such functionality is implemented as hardware or software depends upon the particular application and design constraints imposed on the overall system. The described functionality may be implemented in varying ways for each particular application, but such implementation decision should not be interpreted as causing a departure from the scope of the present disclosure.

For simplicity and clarity, the full structure and operation of all systems suitable for use with the present disclosure is not being depicted or described herein. Instead, only so much of a system as is unique to the present disclosure or necessary for an understanding of the present disclosure is depicted and described.

What is claimed is:

1. A method for operating a high speed data communication device, comprising:
   detecting a start of frame packet (μSOF) on a data bus, wherein the μSOF indicates the start of a microframe;
   determining whether there are any data packets contained in the microframe during a first threshold period after the μSOF; and
   detecting that there is no data packet contained in the microframe during the first threshold period after the μSOF, and in response, transitioning one or more transmitters from an active state to an OFF state, and transitioning the one or more transmitters from the OFF state to the active state prior to a switchback period before the end of the microframe.

2. The method of claim 1, further comprising transitioning the one or more transmitters from the OFF state to the active state when a data packet is received in the OFF state.

3. The method of claim 1, wherein the switchback period is greater than the maximum time required for the one or more transmitters to transition from the OFF state to the active state.

4. The method of claim 1, wherein the length of the microframe is 125 μs.

5. The method of claim 1, further comprising:
   receiving a data packet in the OFF state;
   dropping the data packet received in the OFF state; and
   transitioning the one or more transmitters from the OFF state to the active state when the data packet is dropped.

6. The method of claim 1, further comprising:
   setting a timer with at least a first, a second, and a third expiration time, wherein the first expiration time is the length of the microframe, the second expiration time is the first threshold period, and the third expiration time is the switchback period; and
   operating the high speed data communication device using the timer.

7. The method of claim 1, further comprising transmitting a data packet received in the active state.

8. The method of claim 1, wherein the high speed data communication device is an eUSB2 repeater.

9. The method of claim 1, wherein the high speed data communication device is a USB 2.0 redriver.

10. The method of claim 1, wherein the one or more transmitters are disabled in the OFF state.

11. A method for operating a high speed data communication device, comprising:
    detecting a start of frame packet (μSOF) on a data bus, wherein the μSOF indicates the start of a microframe;
    determining whether there are any data packets contained in the microframe during a first threshold period after the μSOF;
    detecting that there is no data packet contained in the microfame during the first threshold period after the μSOF, and in response, transitioning one or more transmitters from an active state to an OFF state; and
    transitioning the one or more transmitters from the OFF state to the active state in response to receiving a data packet in the OFF state prior to a switchback period before the end of the microframe.

12. The method of claim 11, wherein the length of the second threshold period is twice the length of the first threshold period.

13. The method of claim 11, wherein the switchback period is greater than the time required for the one or more transmitters to transition from the OFF state to the active state.

14. The method of claim 11, further comprising:
    receiving a data packet in the OFF state;
    dropping the data packet received in the OFF state; and
    transitioning the one or more transmitters from the OFF state to the active state when the data packet is dropped.

15. The method of claim 11, further comprising:
    setting a timer with at least a first, a second, a third, and a fourth expiration time, wherein the first expiration time is the length of the microframe, the second expiration time is the first threshold period, and the third expiration time is the second threshold time, and the fourth expiration time is the switchback period; and
    operating the high speed data communication device using the timer.

16. The method of claim 11, further comprising transmitting a data packet received in the active state.

17. The method of claim 11, wherein the high speed data communication device is an eUSB2 repeater.

18. The method of claim 11, wherein the high speed data communication device is a USB 2.0 redriver.

19. A method for operating a high speed data communication device, comprising:
    detecting a start of frame packet (μSOF) on a data bus, wherein the μSOF indicates the start of a microframe having a length of 125 μs;
    setting a timer with at least a first, a second, a third, and a fourth expiration time, wherein the first expiration time is 125 μs, the second expiration time is a first threshold period, the third expiration time is a second threshold time, and the fourth expiration time is a switchback period;
    determining whether there are any data packets contained in the microframe during the first threshold period after the μSOF;
    detecting that there is no data packet contained in the microframe during the first threshold period after the μSOF, and in response, transitioning one or more transmitters from an active state to an OFF state; and
    transitioning the one or more transmitters from the OFF state to the active state in response to receiving a data packet in the OFF state prior to the switchback period before the end of the microframe.

20. The method of claim 19, wherein the length of the second threshold period is twice the length of the first threshold period.

21. The method of claim 19, further comprising:
receiving a data packet in the OFF state;
dropping the data packet received in the OFF state; and
transitioning the one or more transmitters from the OFF state to the active state when the data packet is dropped.

22. The method of claim 19, wherein the high speed data communication device is an eUSB2 repeater.

23. The method of claim 19, wherein the high speed data communication device is a USB 2.0 redriver.

* * * * *